(12) United States Patent
DeCato et al.

(10) Patent No.: US 6,444,740 B1
(45) Date of Patent: Sep. 3, 2002

(54) OIL RESISTANT COMPOSITIONS

(75) Inventors: Alfred A. DeCato, Novarese (IT);
Lester D. Bennington, East Hartford, CT (US)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/831,465

(22) PCT Filed: Nov. 2, 1999

(86) PCT No.: PCT/US99/25622
§ 371 (c)(1),
(2), (4) Date: Sep. 27, 2001

(87) PCT Pub. No.: WO00/27910
PCT Pub. Date: May 18, 2000

Related U.S. Application Data
(60) Provisional application No. 60/107,647, filed on Nov. 9, 1998.

(51) Int. Cl.[7] .................................. C08K 3/26
(52) U.S. Cl. ................... 524/425; 524/433; 524/588; 524/788; 428/447; 427/387
(58) Field of Search ................ 524/425, 433, 524/588, 788; 428/447; 427/387

(56) References Cited

U.S. PATENT DOCUMENTS

| | | | |
|---|---|---|---|
| 5,064,898 A | * 11/1991 | Arai et al. | 524/780 |
| 5,082,886 A | * 1/1992 | Jeram et al. | 524/403 |
| 5,086,107 A | 2/1992 | Arai et al. | 524/424 |
| 6,103,804 A | * 8/2000 | Davis | 524/431 |

* cited by examiner

Primary Examiner—Margaret G. Moore
(74) Attorney, Agent, or Firm—Hoffmann & Baron, LLP

(57) ABSTRACT

The present invention provides silicone compositions, cured elastomers thereof demtonstrate improved resistance to oil. The compositions include a reactive silicone component, wherein the silicone component cures by way of an addition cure mechanism or a condensation cure mechanism; and a basic filler component to confer oil resistance to the cured elastomer. Where the reactive silicone component cures by way of an addition cure mechanism, an addition cure catalyst is also included. To that end, in one embodiment of the invention, the composition includes a vinyl-terminated silicone fluid, a hydrogen-functionalized silicone fluid; a basic filler to confer oil resistance to the cured elastomer and an addition cure catalyst. In another embodiment of the invention, the composition includes a hydroxy-terminated diorganopolysiloxane, a precipitated calcium carbonate, at least about 5% by weight of a composition comprising magnesium oxide particles having a mean particle size of about 0.5 $\mu M$ to about 1.5 $\mu M$ and a mean surface area of about 50 $M^2/g$ to about 175 $M^2/g$ and a crosslinker.

21 Claims, No Drawings

OIL RESISTANT COMPOSITIONS

This application claims benefit of provisional application No. 60/107,647 Nov. 9, 1998.

BACKGROUND OF THE INVENTION

1. Field of the invention

The present invention provides silicone compositions, with cured elastomers thereof demonstrating improved resistance to oil and improved adhesion retention.

2. Brief Description of Related Technology

Silicone compositions have excellent sealing and adhesive properties, and have many commercial uses. For instance, they can be formed into gaskets which are used extensively in the automotive industry or applied as conformal coatings in electronics applications.

In use, silicone compositions may become exposed to a variety of conditions, and should continue to function without compromised integrity. One such condition includes exposure to oil.

Oil resistant silicone sealant compositions generally are known. In particular, U.S. Pat. No. 4,514,529 (Beers) generally discloses a low modulus, high elongation RTV silicone composition having oil resistance. This composition may include a devolatilized silanol-terminated diorganosiloxane of 2,000 to 250,000 Cst, a devolatilized diorganosiloxane fluid plasticizer terminated with triorganosiloxy groups, a cross-linking agent, a catalyst and a filler. Articles formed from such a composition can be used as, e.g., gasket sealants, as well as formed-in-place gaskets for use on internal combustion engines.

U.S. Pat. No. 4,673,750 (Beers), U.S. Pat. No. 4,735,979 (Beers) and U.S. Pat. No. 4,847,396 (Beers) generally disclose adhesion promoter compositions for use in auto-adhering, one-component RTV silicone sealant systems having oil resistance. The adhesion promoters set forth in these patents include glycidoxyalkyl substituted mixed alkoxy-oxime silanes and di-substituted mixed oxime-alkoxysilylalkyl ureas, respectively.

The RTV silicone compositions which contain these oxime adhesion promoters generally include polydimethylsiloxanes, trimethylsilyl terminated polydimethylsiloxanes and various other fillers, additives and catalysts. Such compositions may be used to make, e.g., formed-in-place gasket materials.

International PCT Publication No. WO 93/19130 discloses a one-part RTV silicone rubber composition as a formed-in-place gasket having oil resistant properties. Such a composition includes a diorganopolysiloxane, an M-stopped plasticizer, such as a trimethyl-terminated non-reactive silicone composition, gamma-aminopropyltriethoxysilane, a catalyst, a crosslinker and various fillers.

One drawback to the RTV silicone compositions above is their rate of cure, which is commercially unacceptable for certain applications, such as sealing electronic modules, where high volume production may depend upon cure rate. Accordingly, silicone compositions with improved cure rates are desirable.

In addition, inclusion of certain grades of metal oxides to silicone elastomers is known to result in silicone rubber compositions having a certain degree of oil resistance. For example, European Patent Publication No. 572 148 assigned to General Electric Company discloses the incorporation of mixed metal oxides into heat cured silicone elastomeric compositions containing MQ resins (M represents $R_3SiO_{1/2}$ monofunctional groups; Q represents $SiO_2$ quadri-functional groups). In the '148 publication, such compositions are formed into engine gaskets which are reported to display a certain degree of oil resistance. Magnesium oxide is disclosed as one component of a mixture of metal oxides from group (IIa) and (IIb). The '148 publication, however, is silent as to the benefits, if any, conveyed by the use of a single metal oxide on the oil resistance of the final elastomer.

U.S. Pat. No. 5,082,886 also assigned to General Electric Company describes liquid injection molded ("LIM") silicone compositions containing magnesium oxide to allegedly impart oil resistance to the elastomeric product. The use of magnesium oxide in the LIM system, however, adversely affected the compression set imparted by the platinum catalyst. Thus, to counteract this affect, cerium hydroxide or tetramethyldivinyldisilane was also added. This additional reagent not only adds another step and ingredient to the process but also increases the cost of the final product.

U.S. Pat. No. 4,052,357 assigned to Dow Corning Corporation describes a silicone rubber composition used as a seal or gasket. This composition includes a polydiorganosiloxane gum, a reinforcing silica filler, a hydroxylated diorganosilicone, fiberized blast furnace slag fibers and an alkoxy silicone. It is suggested by the '357 patent that the addition of magnesium oxide to this composition imparts a certain degree of oil resistance thereto. Such a composition is inconvenient and more expensive to produce because of its requirement for fiberized blast furnace slag fibers. Moreover, the presence of such fibers decreases the tear strength of the end product.

These patent documents describe the use of magnesium oxide to impart a certain level of oil resistance to various types of silicone elastomers. These silicone elastomers, however, suffer from the draw back that the oil resistance conveyed by the magnesium oxide is of marginal utility because the physical characteristics of the magnesium oxide used is not optimized for the desired oil resistant property.

To date, it is not believed that a filler has been included in such addition curable silicone composition for the purpose of conferring oil resistance to the cured elastomer.

In addition, it would be desirable for a sealant composition to be imparted with improved oil resistance by optimizing the physical characteristics of the magnesium oxide particles dispersed therein.

SUMMARY OF THE INVENTION

The present invention provides silicone compositions, with cured elastomers thereof demonstrate improved resistance to oil and improved adhesion retention. The compositions include broadly a reactive silicone component, where the silicone component cures by way of an addition cure mechanism or a condensation cure mechanism; and a basic filler component to confer oil resistance to the cured elastomer. Where the reactive silicone component cures by way of an addition cure mechanism, an addition cure catalyst is also provided.

In one aspect of the invention, therefore, the compositions include an addition curable silicone component, a basic filler component to confer oil resistance to the cured elastomer and an addition cure catalyst.

In one embodiment of this aspect of the present invention, it has been found surprisingly that addition curable silicone compositions may be rendered resistant to oil by including basic fillers, such as inorganic basic fillers like certain carbonates with or without certain oxides, such as calcium carbonate and magnesium oxide.

In another embodiment of this aspect of the invention, the compositions includes a hydroxy-terminated diorganopolysiloxane, a precipitated calcium carbonate, at least about 5% by weight of a composition including magnesium oxide particles having a mean particle size of about 0.5 μM to about 1.5 μM and a mean surface area of about 50 $M^2/g$ to about 175 $M^2/g$ and a crosslinker.

In this regard, it has also surprisingly been found that by incorporating a particular grade of magnesium oxide within a particular range into a silicone composition that remarkably superior oil resistance can be imparted to the cured elastomer formed therefrom compared to known silicone compositions having magnesium oxide particles with physical characteristics which do not optimize oil resistance in the cured elastomer. Such compositions are especially useful as gear oil resistant articles.

The invention also provides a method of applying silicone compositions as described above to a surface which would be expected to be exposed to oil during its intended use.

The invention also provides methods of improving oil resistance in a silicone sealant. These methods include providing the silicone sealant, and incorporating into the sealant a filler component to confer oil resistance to the cured elastomer.

The invention also provides elastomeric silicone articles having improved oil resistance formed from compositions as described above.

The invention also includes methods of providing an oil resistant silicone sealant to a surface exposed to oil. These methods include applying to the surface an effective amount of a composition as described above. The composition is then formed into an appropriate sealing configuration and then cured or allowed to cure.

The present invention will be more fully understood by a reading of the section entitled "Detailed Description of the Invention".

DETAILED DESCRIPTION OF THE INVENTION

The present invention is directed to silicone compositions, cured elastomers of which having improved adhesive properties when exposed to oil. The compositions include a reactive silicone component, where the silicone component cures by way of an addition cure mechanism or a condensation cure mechanism; and a basic filler component to confer oil resistance to the cured elastomer. Where the reactive silicone component cures by way of an addition cure mechanism, an addition cure catalyst is also provided.

In one embodiment, therefore, there is provided a silicone composition that includes an addition curable silicone component, such as one comprising a vinyl-terminated silicone fluid and at least one hydrogen-functionalized silicone fluid, a basic filler to confer oil resistance to the cured elastomer, and an addition cure catalyst. The reaction product of this composition is an oil resistant adhesive, which has a commercially attractive cure rate.

As used herein, "addition curable silicone component" includes addition curing silicone fluids curable under elevated temperature conditions. Such polymers are capable of curing in the presence of an addition cure catalyst at elevated temperature conditions, such as over about 100° C.

The addition curable silicone component of the present invention contains functional groups capable of undergoing addition reactions in the presence of an addition cure catalyst. Typically, the addition curable silicone component includes, for example, polydiorganosiloxanes having terminal vinyl groups that are curable, together with polydiorganosiloxanes having, for example, hydride functionality available for reaction to form an elastomer.

The vinyl-terminated polydimethylsiloxanes may be used in an amount within the range of about 25 to about 90% by weight of the composition, such as about 35 to about 50% by weight.

Examples of the vinyl-terminated polydimethylsiloxanes may be found within the following structure I:

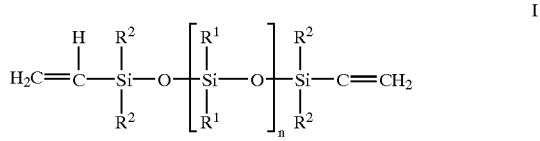

where $R^1$ and $R^2$ may be the same or different, and are selected from alkoxy, aryl, alkyl, haloalkyl (such as triflouropropyl), hydride, hydroxide and the like; and n is an integer between about 25 and 100,000.

The hydride-functionalized polydimethylsiloxanes should be present in an amount within the range of about 1 to about 15% by weight of the total composition, such as about 10 to about 12% by weight.

Examples of the hydride-functionalized polydimethylsiloxanes may be found within the following structure II:

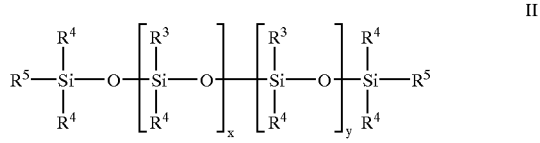

where at least one $R^3$ is hydrogen and the other $R^3$ is within $R^4$, $R^4$ is an unsubstituted or substituted monovalent hydrocarbon group exemplified by alkyl groups, such as methyl, ethyl, propyl and butyl groups; cycloalkyl groups, such as cyclopentyl and cyclohexyl groups; alkenyl groups, such as vinyl and allyl groups; and aryl groups, such as phenyl and tolyl groups; as well as those substituted groups obtained by replacing at least a portion of the hydrogen atoms in the hydrocarbon groups with electron withdrawing groups, such as halogen atoms, cyano groups and the like; $R^5$ is hydrogen, or an unsubstituted or substituted monovalent hydrocarbon group exemplified by alkyl groups, such as methyl, ethyl, propyl and butyl groups; cycloalkyl groups, such as cyclopentyl and cyclohexyl groups; alkenyl groups, such as vinyl and allyl groups; and aryl groups, such as phenyl and tolyl groups; as well as those substituted groups obtained by replacing at least a portion of the hydrogen atoms in the hydrocarbon groups with electron withdrawing groups, such as halogen atoms, cyano groups and the like; or $R^3$ is within $R^4$, provided at least one $R^5$ is hydrogen; and x is an integer within the range of about 3 and 10 and y is an integer within the range of 0 to about 10,000.

In the present invention, either or both of these polyorganosiloxanes can have viscosities that range from about 2,000 cst to about 200,000 cst, desirably from about 4,000 cst to about 50,000 cst, such as from about 6,000 cst to about 20,000 cst.

The silicone compositions of the present invention also include certain fillers to assist in conferring oil resistance properties to the final cured elastomer. The fillers are basic in nature so that they are available to react with any acidic by-products formed in the working environment in which the inventive composition is intended to be used. By so doing, the fillers neutralize acidic by-products before such by-products degrade the elastomers, thereby improving adhesion retention.

These fillers include, for example, lithopone, zirconium silicate, hydroxides, such as hydroxides of calcium, aluminum, magnesium, iron and the like, diatomaceous earth, carbonates, such as sodium, potassium, calcium, and magnesium carbonates, oxides, such as zinc magnesium, chromic, zirconium and aluminum oxides, calcium clay, graphite, synthetic fibers and mixtures thereof. Other conventional fillers can also be incorporated into the present compositions provided they impart basicity to the compositions, and do not adversely effect the oil resistant curing mechanism and adhesive properties of the final produced therefrom. Desirable among these fillers is calcium carbonate, such as hydrophilic calcium carbonate.

The filler may be used in an amount within the range of about 5 to 70% by weight of the total composition, such as about 25 to about 50% by weight.

The inventive silicone compositions also include an addition cure catalyst. Suitable addition cure catalysts that can be used with the present compositions include platinum-based ones, such as platinum-siloxane complex commercially available from Bayer Corporation under the trade designation BAYSILONE U catalyst Pt/L (CAS 73018-55-0).

The addition cure catalyst should be used in an amount within the range of about 0.001 to about 1% by weight of the total composition.

Other additives can also be incorporated into the inventive compositions, provided they do not adversely affect the ability of the compositions to resist oil, and to maintain their excellent adhesive properties. For example, an adhesion promoter can be added to the inventive compositions. Such an adhesion promoter can include, for example, octyl trimethoxysilane (commercially available from Witco Corporation, Greenwich, Conn. under the trade designation A-137), glycidyl trimethoxysilane (commercially available from Witco under the trade designation A-187), methacryloxypropyl trimethoxysilane (commercially available from Witco under the trade designation A-174), vinyl trimethoxysilane and combinations thereof.

The adhesion promoters, when present, may be used in an amount within the range of about 0.05 to about 2% by weight of the total composition.

The silicone compositions of the present invention may also include a plasticizer, such as aliphatic liquid polymers and oils, when it is desirable for the composition or cured elastomer thereof to have physical properties and characteristics that are modified by inclusion of such a material. Other organic plasticizers that can be used in the present invention include, for example, petroleum derived organic oils. Moreover, other suitable organic plasticizers include, for example, alkyl phosphates, polyalkylene glycol, poly (propylene oxides), hydroxyethylated alkyl phenol, dialkyldithiophosphonate, poly(isobutylenes), poly($\alpha$-olefins) and mixtures thereof.

Desirably, the plasticizer is a liquid polyisobutylene or other similar composition. The plasticizer component may provide further oil resistance to the cured elastomer.

In the inventive compositions, effective amounts of organic plasticizers may be added to aid the workability of the final cured elastomer. Accordingly, from about 1 to about 50% by weight of a selected organic plasticizer can be incorporated into the compositions of the present invention. Desirably, from about 10 to about 35% by weight of a selected organic plasticizer, such as about 15 to about 25%, can be incorporated into the compositions of the present invention.

The silicone compositions of the present invention may also include crosslinkers. The crosslinkers are those capable of reacting with vinyl-terminated and/or hydride-functionalized polydimethylsiloxanes. For instance, trimethylsilyl-terminated hydrogenmethyl dimethyl siloxane copolymer with two or more hydrides per molecule (commercially available from PPG Industries as MASIL XL-1) is appropriate for use herein.

Other conventionally known crosslinkers can also be used with the present compositions provided they are able to crosslink the present compositions through an addition cure mechanism without adversely affecting the adhesive and oil resistant properties of the final elastomeric articles formed therefrom.

In addition, to modify the dispensing properties through viscosity adjustment, a thixotropic agent may also be included. The thixotropic agent may be used in am amount within the range of about 0.05 to about 25% by weight of the total composition. Examples of such a thixotropic agent include reinforcing silicas, such as fused or fumed silicas, and may be untreated or treated so as to alter the chemical nature of their surface. Virtually any reinforcing fused or fumed silica may be used.

Examples of such treated fumed silicas include polydimethylsiloxane-treated silicas and hexamethyldisilazane-treated silicas. Such treated silicas are commercially available, such as from Cabot Corporation under the tradename CAB-O-SIL ND-TS and Degussa Corporation under the tradename AEROSIL, such as AEROSIL R805.

Of the untreated silicas, amorphous and hydrous silicas may be used. For instance, commercially available amorphous silicas include AEROSIL 300 with an average particle size of the primary particles of about 7 nm, AEROSIL 200 with an average particle size of the primary particles of about 12 nm, AEROSIL 130 with an average size of the primary particles of about 16 nm; and commercially available hydrous silicas include NIPSIL E150 with an average particle size of 4.5 nm, NIPSIL E200A with and average particle size of 2.0 nm, and NIPSIL E220A with an average particle size of 1.0 nm (manufactured by Japan Silica Kogya Inc.).

Other desirable materials for use as the thixotropic agent include those constructed of or containing aluminum oxide, silicon nitride, aluminum nitride and silica-coated aluminum nitride.

Hydroxyl-functional alcohols are also well-suited as the thixotropic agent, such as tris[copoly(oxypropylene) (oxypropylene)]ether of trimethylol propane, $[H(OC_3H_6)_x (OC_2H_4\cdot)_y$—O—$CH_2]_3$—C—$CH_2$—$CH_3$, where x and y are each integers that may be the same or different and are within the range of about 1 to about 8,000, and is available commercially from BASF Wyandotte Corp., Wyandotte, Mich. under the tradename PLURACOL V-10.

In another embodiment, there is provided compositions which are formed from a mixture of a polysiloxane, a precipitated calcium carbonate, a magnesium oxide of a particular grade and a crosslinker.

For purposes of this aspect of the present invention, any conventional polysiloxane which is able to form an effective sealant when cured and which is rendered oil resistant by magnesium oxide can be incorporated into the present compositions. Desirably, the polysiloxane is a hydroxy-terminated diorganopolysiloxane represented by the following structure III:

$$HO-(-SiR^6R^7-O-)_m-H \qquad (III)$$

where $R^6$ and $R^7$ are independently an unsubstituted or substituted monovalent hydrocarbon group exemplified by alkyl groups, such as methyl, ethyl, propyl and butyl groups; cycloalkyl groups, such as cyclopentyl or cyclohexyl groups; alkenyl groups, such as vinyl and allyl groups; and aryl groups, such as phenyl and tolyl groups; as well as those substituted groups obtained by replacing a part or all of the hydrogen atoms in the above-referenced hydrocarbon groups with halogen atoms (such as trihalopropyl), cyano groups and the like.

The hydroxy-terminated diorganopolysiloxane is present in these compositions, for example, in an amount from about 30 to about 90% by weight of the total composition. Desirably, the hydroxy-terminated diorganopolysiloxane is present in these compositions from about 30 to about 50% by weight.

As the basic filler component the present composition may also include a precipitated calcium carbonate. Any commercially available precipitated calcium carbonate can be used with the present invention. The precipitated calcium carbonate should be present, for example, in an amount from about 5 to about 50% by weight of the total composition. Desirably, the calcium carbonate is present in an amount from about 5 to about 15% by weight.

Together with the precipitated calcium carbonate, the present composition may also include in the basic filler component magnesium oxide particles. Surprisingly, it has been found that magnesium oxide particles in an amount greater than about 5% and having a mean particle size of about 0.5 $\mu$M to about 1.5 $\mu$M and a mean surface area of about 50 $M^2/g$ to about 175 $M^2/g$ when added to a silicone composition as described herein provide the composition with significantly enhanced resistance to oil compared to conventional silicone sealant compositions containing magnesium oxide. Desirably, the magnesium oxide particles are present in an amount between about 5 to about 50% by weight of the total composition, such as, for example, from about 10 to about 25% by weight. Any magnesium oxide meeting the above-described physical characteristics may be used in accordance with the present invention. Desirably, the magnesium oxide particles of the present invention are MAGCHEM 50M and MAGCHEM 200-AD, available commercially from Martin Marietta Magnesia Specialties, Inc., Baltimore, Md. Such commercially available compositions contain about 90% by weight or more magnesium oxide particles with a variety of other filler materials including, for example, calcium oxide, silicon dioxide, iron oxides, aluminum oxide and sulfur trioxide.

The present compositions may also include one or more crosslinkers. The crosslinker may be a hexafunctional silane, though other crosslinkers may also be used. Examples of such crosslinkers include, for example, methyltrimethoxysilane, vinyltrimethoxysilane, methyltriethoxysilane, vinyltriethoxysilane, methyltriacetoxysilane, vinyltriacetoxysilane, methyl tris-(N-methylbenzamido)silane, methyl tris-(isopropenoxy) silane, methyl tris-(cyclohexylamino)silane, methyl tris-(methyl ethyl ketoximino)silane, vinyl tris-(methyl ethyl ketoximino)silane, methyl tris-(methyl isobutyl ketoximino) silane, vinyl tris-(methyl isobutyl ketoximino)silane, tetrakis-(methyl ethyl ketoximino)silane, tetrakis-(methyl isobutyl ketoximino)silane, tetrakis-(methyl amyl ketoximino)silane, dimethyl bis-(methyl ethylketoximino) silane, methyl vinyl bis-(methyl ethyl ketoximino)silane, methyl vinyl bis-(methyl isobutyl ketoximino)silane, methyl vinyl bis-(methyl amyl ketoximino)silane, tetrafunctional alkoxy-ketoxime silanes, tetrafunctional alkoxy-ketoximino silanes and enoxysilanes.

Typically, the crosslinkers used in of the present compositions are present from about 1 to about 10% by weight of the total composition. The exact concentration of the crosslinker, however, may vary according to the specific reagents, the desired cure rate, molecular weight of the silanol polymer(s) used and the intended use of the final elastomer.

The catalyst used in the present compositions include, for example, condensation (sometimes referred to as room temperature vulcanization or "RTV") cure catalysts. Any condensation cure catalyst may be employed with the present compositions provided the excellent sealant and oil resistant properties of the final elastomeric articles are not compromised. Suitable catalysts that can be used with the present compositions include, for example, alkyl substituted titanates, zirconates, dialkyl dicarboxylated tin, amines and mixtures thereof. Suitable amine catalysts include, for example, amino-functional silanes. Other suitable catalysts or catalyst combinations that can be used with the present invention include, for example, dibutyltin dilaurate, dibutyltin diacetate, dibutyltin dioctanoate, dibutyltin maleate, dialkyl tin hexanoate, dioctyltin dilaurate, iron octanoate, zinc octanoate, lead octanoate, cobalt naphthenate, tetrapropyltitanate, tetrabutyltitanate, tin dimethyl bis neodecanoate, dialkyl tin carboxylates, mercaptans, titanates, zirconates and the like, and mixtures thereof.

Typically, the catalyst will be present in an amount sufficient to allow for the formation of the final elastomer. Generally, the catalyst is present from about 0.05 to about 1% by weight of the total composition, however, this may vary depending upon the reagents, desired cure rate and reaction conditions used.

The selection of the appropriate catalyst will, of course, depend on the intended use of the elastomeric article, as well as the selection of reactants used to form the final elastomer.

Other additives can also be incorporated into the present compositions provided they do not adversely effect the ability of these compositions to resist certain organic solvents, such as oil, and to maintain their excellent properties. For example, an adhesion promoter can be added to the present compositions. Such an adhesion promoter can include, for example, gamma-aminopropyltriethoxysilane, gamma-aminopropyltrimethoxysilane, N-(2-aminoethyl)-3-aminopropyltriethoxysilane, N-(2-aminoethyl)-3-aminopropyltrimethoxysilane, trimethoxysilylpropyldiethylene triamine, 3-glycidoxypropyltrimethoxy silane, gamma-mercaptopropyltrimethoxysilane and gamma-methacryloxypropyltrimethoxysilane.

Conventional pigments, such as for example, titanium dioxide pigment, can also be incorporated into the present invention provided they do not adversely effect the oil resistant and sealant properties of the final end product produced therefrom.

In the present compositions, effective amounts of plasticizers may be added to ensure the desired workability and performance of the final elastomer. Silicone and organic plasticizers can be used with the present invention. Suitable plasticizers include, for example, trimethyl-terminated polyorganosiloxanes, polybutenes, alkyl phosphates, polyalkylene glycol, poly(propylene oxides), hydroxyethylated alkyl phenol, dialkyldithiophosphonate, poly(isobutylenes), poly($\alpha$-olefins) and mixtures thereof. Typically, from about 10 to about 40% by weight of a plasticizer may be incorporated into the compositions of the present invention.

Reaction products of the inventive compositions are useful as adhesives for bonding together, or sealants for sealing or encapsulating, surfaces that are exposed to oil during their intended use.

The compositions of the present invention may also be formed into many different configurations and then addition cured. Articles formed in such a manner are useful in various industries where there is a need for oil resistant silicone-based elastomeric articles. In the vehicular assembly industry, for example, O-rings, hoses, seals, and gaskets can be formed from the present compositions. Other conventional uses requiring good adhesive properties, as well as oil resistance are also contemplated for the inventive compositions.

In another aspect of the present invention, there is provided a method of applying a silicone composition to a surface exposed to oil during its intended use. The surface to which the present compositions are applied can be any work surface that is exposed to oil, such as certain work surfaces of conventional internal combustion engines. This method includes applying a composition of the present invention to the work surface.

The work surface may be constructed of a variety of materials, such as most metals, glass and commodity or engineered plastics.

In yet another aspect of the present invention, there is provided a method of using an oil resistant mechanical seal, which remains adhesive after exposure to oil. This method includes applying a seal forming amount of the composition as described previously onto a surface of a mechanical part. A seal is then formed between at least two mechanical surfaces by addition cure through exposure to elevated temperature conditions, after which the seal remains competent even when exposed to oil at extreme temperature conditions over extended periods of time.

In still yet another aspect of the present invention, there is provided a method of using an oil resistant sealing member that remains adhesive after contact with and/or immersion in oil. This method includes forming a seal between two or more surfaces by applying therebetween the oil resistant sealing member formed from a composition according to the present invention.

With respect to the second embodiment of the present invention, there is provided a method of improving oil resistance in such a silicone sealant composition. This method includes the steps of (a) providing the silicone sealant, (b) incorporating into the sealant at least about 5% by weight of a composition that includes magnesium oxide particles having a mean particle size of about 0.5 $\mu$M to about 1.5 $\mu$M and a mean surface area of about 50 M$^2$/g to about 175 M$^2$/g and (c) crosslinking the silicone sealant to form an oil resistant elastomeric article.

Desirably, this sealant composition includes from about 30 to about 90% by weight of a hydroxy-terminated diorganopolysiloxane, from about 5 to about 50% by weight of a precipitated calcium carbonate and from about 1 to about 10% by weight of a crosslinker, each of which is by weight of the total composition. The sealant composition can also include other optional components including for example, plasticizers, catalysts, adhesion promoters, pigments and the like.

Again with respect to the second embodiment of the present invention, there is provided an elastomeric silicone article having improved oil resistance which is formed from a composition that includes (a) a hydroxy-terminated diorganopolysiloxane, (b) a precipitated calcium carbonate, (c) at least about 5% by weight of a composition including magnesium oxide particles having a mean particle size of about 0.5 $\mu$M to about 1.5 $\mu$M and a mean surface area of about 50 M$^2$/g to about 175 M$^2$/g, (d) a crosslinker, (e) an effective amount of a plasticizer and (f) a catalyst.

The elastomeric article according to the present invention contains, for example, from about 30 to about 90% by weight of a hydroxy-terminated diorganopolysiloxane, at least about 5% by weight of a precipitated calcium carbonate and from about 1 to about 10% by weight of the crosslinker, each of which is by weight of the total composition.

Yet again with respect to the second embodiment of the present invention, there is provided a method of providing an oil resistant silicone sealant to a surface exposed to oil. This method includes applying to the surface an effective amount of a composition that includes (a) a hydroxy-terminated diorganopolysiloxane, (b) a precipitated calcium carbonate, (c) at least about 5% by weight of a composition including magnesium oxide having a mean of particle size of about 0.5 $\mu$M to about 1.5 $\mu$M and a mean surface area of about 50 M$^2$/g to about 175 M$^2$/g and (d) a crosslinker. This composition is then formed into an appropriate sealing configuration. The composition is then cured at elevated temperatures or allowed to cure under ambient conditions.

In this method, the hydroxy-terminated diorganopolysiloxane, precipitated calcium carbonate and crosslinker are present in amounts from, for example, about 30–90%, 5–50% and 1–10% by weight of the total composition, respectively. Other optional components can be included in the composition including for example, plasticizers, catalysts, adhesion promoters, pigments and the like.

A further step in this method includes forming a seal with the oil resistant sealant about a surface exposed to oil. The form of the seal can take various conventional forms including, for example as noted above, a gasket or an O-ring.

The following examples are provided to further illustrate methods of preparation of the oil resistant silicone sealant compositions, as well as certain physical properties thereof. These examples are illustrative only and are not intended to limit the scope of the invention in any way.

EXAMPLES

Example 1

In this example, uncured oil resistance silicone compositions were prepared, a first of which is within the scope of the present invention and a second of which contains a filler outside of the scope of the present invention for comparative properties. A variety of physical properties of the cured elastomers were evaluated following cure (Table 2) and then after immersion in a motor oil bath (5W30) maintained at a temperature of about 150° C. for a period of time of about 72 hours.

TABLE 1

| Component | Composition (% by weight) | |
|---|---|---|
| | 1 | 2 |
| Vinyl-terminated PDMS | 44.46 | 46.46 |
| Hydride-functionalized PDMS | 10.64 | 10.64 |
| Filler | 42.75 | 42.75 |
| Adhesion Promoter | 0.95 | 0.95 |

TABLE 1-continued

|  | Composition (% by weight) | |
| --- | --- | --- |
| Component | 1 | 2 |
| Volatile inhibitor | 0.21 | 0.21 |
| Thixotrope | 0.95 | 0.95 |
| Addition Cure Catalyst | 0.05 | 0.05 |

Compositions 1 and 2 set forth in Table 1 were prepared by combining the constituents with mixing for approximately 5 minutes, and applying a vacuum. Mixing was continued under vacuum for approximately 3 hours at 100° C.

The respective compositions were then allowed to cool to room temperature (approximately 25° C.).

The sole difference between Compositions 1 and 2 resides in the nature of the filler. The filler chosen in Composition 1 was calcium carbonate, whereas the filler chosen in Composition 2 was a quartz material, sold under the tradename MIN-U-SIL.

The compositions were applied to lap shears, constructed of aluminum, which were then mated to form an assembly. The compositions were then cured by exposing the mated assembly to a temperature of about 150C for a period of time of about 1 hour.

Certain physical properties of Compositions 1 and 2 were evaluated and are set forth in Table 2 infra. The data in Table 2 represents the average values derived from each composition, run in triplicate, before immersion in the oil bath.

TABLE 2

| | Before Oil Immersion | | | |
| --- | --- | --- | --- | --- |
| Comp. | Duro Hardness (Shore A) | Tensile Strength (psi) | Elongation (%) | 10 mil Shear Str. (psi) |
| 1 | 85 | 317 | 534 | 218 |
| 2 | 84 | 303 | 184 | 293 |

After immersion in a motor oil bath (5W30) maintained at a temperature of about 150° C. for a period of time of about 72 hours, the cured elastomers showed the following data from triplicate runs.

TABLE 3

| | After Oil Immersion | | | |
| --- | --- | --- | --- | --- |
| Comp. | Duro Hardness (Shore A) | Tensile Strength (psi) | Elongation (%) | 10 mil Shear Str. (psi) |
| 1 | 70 | 275 | 323 | 159 |
| 2 | 54 | 104 | 274 | 153 |

As the data indicate, the inventive composition retains more of its hardness, tensile strength and elongation after immersion in oil at elevated temperatures compared to the comparative composition. Indeed, the Duro Hardness data indicates that Composition 1 demonstrated only an 18% decrease, whereas Composition 2 demonstrated a 36% decrease. Similarly, Composition 1 demonstrated only a 15% decrease in tensile strength, whereas Composition demonstrated a 66% decrease in tensile strength.

Example 2
Preparation of Inventive Composition as Regards Second Aspect and Comparative Silicone Sealant Compositions Cured elastomers prepared from Composition 3 and Composition 4, the formulations of which are set forth below, were prepared and comparative tests performed against a commercially available silicone sealant composition.

| Composition 3 | |
| --- | --- |
| Composition | % (w/w) |
| 2,000 cps Hydroxy-terminated polydimethyl siloxane | 10.0 |
| 6,000 cps Hydroxy-terminated polydimethyl siloxane | 27.15 |
| Surface treated amorphous silica | 4.0 |
| Polyalkylene polyol | 0.5 |
| Surface treated, precipitated calcium carbonate | 10.0 |
| MAGCHEM 50 M | 10.0 |
| Iron aluminum silicate | 30.0 |
| Tetrafunctional oximino silane | 1.5 |
| Vinyl tris oximino silane | 4.0 |
| Ureido silane | 0.75 |
| Hexafunctional silyl ethane | 1.0 |
| Dialkyltin dicarboxylate | 0.1 |
| Carbon black | 1.0 |

| Composition 4 | |
| --- | --- |
| Composition | % (w/w) |
| 2,000 cps Hydroxy-terminated polydimethyl siloxane | 12.0 |
| 6,000 cps Hydroxy-terminated polydimethyl siloxane | 30.65 |
| Surface treated amorphous silica | 4.0 |
| Surface treated, precipitated calcium carbonate | 10.0 |
| MAGCHEM 200 AD | 5.0 |
| Iron aluminum silicate | 30.0 |
| Tetrafunctional oximino silane | 1.5 |
| Vinyl tris oximino silane | 4.0 |
| Ureido silane | 0.75 |
| Hexafunctional silyl ethane | 1.0 |
| Dialkyltin dicarboxylate | 0.1 |
| Carbon black | 1.0 |

The hydroxy-terminated polydimethylsiloxanes, carbon black, polyalkylene polyol (Composition 3) and surface-treated amorphous silica were combined and mixed at medium speed until the solids were wetted in. The composition was then heated to about 220°–240° F. (104°–115° C.) for about 2 hours. To this composition was added surface-treated, precipitated calcium carbonate, iron aluminum silicate and MAGCHEM 50M which had been previously dried at 100° C. for more than 72 hours. The composition was mixed until all components were wetted in. The composition was then mixed on high under vacuum and at 220°–240° F. (104°–115° C.) for 2 hours. This composition was then cooled to 180° F. (82° C.) and a mixture of tetrafunctional oximino silane and vinyl tris oximino silane was then added under $N_2$. This composition was then mixed under vacuum and cooled to about 110° F. (43° C.). Once the temperature reached about 110° F. (43° C.), the vacuum was broken and nitrogen was added. Next, ureido silane, dialkyltindicarboxylate and hexafunctional silyl ethane was added and the resulting composition mixed under vacuum for 15 minutes while it was allowed to cool.

In Composition 3, MAGCHEM 50M was used. This preparation has a mean density of 0.8 $\mu M$ and a surface area of 65 $M^2/g$. Composition 4, however, contained MAGCHEM 200 AD. This preparation has a median density of 1.0 and a surface area of 160 $M^2/g$.

Example 3
Comparison of Oil Resistant Properties of Composition 4 vs. Commercially Available Composition For comparison, a commercially available silicone-based sealant composition containing magnesium oxide and $CaCO_3$ (Composition 5) was obtained and used in the studies set forth below. Certain physical properties of Composition 4 and Composition 5 were evaluated and are set forth in Table 4 infra. Three sets of conventional lap shear specimens were prepared from these compositions and were allowed to cure for 7 days in approximately 50 % relative humidity at approximately 25° C. The data in Table 4 represents the average values derived from each experiment run in triplicate.

The "Control" columns represent the cured elastomers of Composition 4 and Composition 5 without exposure to oil. The "72 hrs." and "168 hrs." columns represent the cured elastomers of Composition 4 and Composition 5 when exposed to a commercially available semi-synthetic gear oil (obtained from Texaco Corp. under the tradename TEXACO 2224) for either 72 or 168 hours at 150° C.

TABLE 4

Comparison of Composition 4 With Commercially Available Composition (Gear Oil)

| | 150° C. | | | | | |
|---|---|---|---|---|---|---|
| | Control | | 72 hrs. | | 168 hrs. | |
| Physical Properties | Comp. 5 | Comp. 4 | Comp. 5 | Comp. 4 | Comp. 5 | Comp. 4 |
| Shore A | 50 | 65 | 40 | 35 | 40 | 40 |
| Tensile (psi) | 213 | 497 | 142 | 116 | 138 | 334 |
| 100% Modulus | 183 | 348 | 137 | — | 109 | 93 |
| % Elongation | 149 | 112 | 109 | 93 | 126 | 181 |

As Table 4 indicates, Composition 4 after approximately 168 hours of oil immersion at 150° C. remains as hard as Composition 5, as indicated by the Duro Hardness (Shore A) test while exhibiting clearly superior tensile strength (334 psi vs. 138 psi, respectively).

A comparison of the oil resistance of the cured composition 5 and Composition 4 was also made when the cured elastomers made with these composition were subjected to a mixture of gear oil and 8% HYPOID (w/w) (an anti-slip additive) over time at 150° C. The data obtained is set forth below as Table 2.

TABLE 5

Comparison of Composition 4 With Commercially Available Composition (Gear oil + Anti-slip Additive)

| | Control | | 72 hrs. | | 168 hrs. | |
|---|---|---|---|---|---|---|
| Physical Properties | Comp. 5 | Comp. 4 | Comp. 5 | Comp. 4 | Comp. 5 | Comp. 4 |
| Shore A | 50 | 65 | 20 | 8 | 11 | 19 |
| Tensile (psi) | 213 | 497 | 109 | 47 | 71 | 27 |
| 100% Modulus | 183 | 348 | 73 | 28 | 45 | — |
| % Elongation | 149 | 112 | 165 | 194 | 207 | 81 |

As Table 5 indicates, the anti-slip additive substantially decreases the oil resistant properties of both the Composition 5 and Composition 4. This effect is especially evident in the tensile strength data in which there is an approximately 3 to 18 fold decrease in the tensile strength of the Composition 5 and Composition 4, respectively, after 168 hours of exposure to the gear oil/anti-slip additive mixture.

Table 6 below summarizes the oil resistant properties of cured elastomers formed from Composition 4.

TABLE 6

Oil Resistance of Composition 4

| Physical Properties | Control | 24 Hours |
|---|---|---|
| Shore A | 47 | 7 |
| Tensile (psi) | 472 | 26 |
| % Elongation | 224 | 246 |

These data indicate that cured elastomers formed from Composition 3 continue to exhibit excellent oil resistance even after 24 hours in gear oil (TEXACO 2224) at 150° C. The data set forth in Tables 4 and 6 indicate that cured elastomers formed from Composition 3 containing MAGCHEM 200AD provide enhanced oil resistance compared to both Composition 4 and commercially available Composition 5 preparation.

Example 4
Comparison of Oil Resistant Properties of Composition 6 vs. Commercially Available Composition Composition 6 was prepared with the following component in the noted amounts.

Composition 6

| Composition | % (w/w) |
|---|---|
| 2,000 cps Hydroxy-terminated polydimethyl siloxane | 13.0 |
| 6,000 cps Hydroxy-terminated polydimethyl siloxane | 30.50 |
| Surface treated amorphous silica | 4.0 |
| Surface treated, precipitated calcium carbonate | 10.0 |
| MAGCHEM 50 M | 20.75 |
| Ground Calcium Carbonate | 15 |
| Tetrafunctional oximino silane | 1.5 |
| Vinyl tris oximino silane | 4.0 |
| Hexafunctional silyl ethane | 0.75 |
| Dialkyltin dicarboxylate | 0.1 |
| Carbon black | 0.2 |

Certain physical properties of Composition 5 and Composition 6 were evaluated and are set forth in Tables 7a–e infra. Three sets of conventional lap shear specimens were prepared from these compositions and were allowed to cure. The data in Table 7a–e represent the average values derived from each experiment run in triplicate.

The "70 hrs.@125° C." and "48 hrs.@125° C." columns represent data for the cured elastomers of Composition 4 and Composition 6 when cured for 7 days in approximately 50% relative humidity at approximately 25° C. (Table 7a) and when exposed to a commercially available gear oil (natural gear oil obtained from 76 Lubricants Co. under the tradename FHP-6, Table 7b; natural gear oil obtained from D. A. Stuart Co. under the tradename STURACO 7061, Table 7c; semi-synthetic oil obtained from Texaco under the tradename TEXACO 2224, Table 7d; and synthetic oil obtained from Henkel Corporation under the tradename EP 75W-90, Table 7e) for the time period and elevated temperature indicated.

TABLE 7a

Comparison of Composition 6
With Commercially Available Composition

| Physical Properties | Control Comp. 6 | Comp. 5 |
|---|---|---|
| Shore A | 58 | 41 |
| Tensile (psi) | 473 | 265 |
| % Elongation | 162 | 333 |

TABLE 7b

Comparison of Composition 6
With Commercially Available Composition
(Natural Gear Oil)

| Physical | 70 hrs. @ 125° C. | |
|---|---|---|
| Properties | Comp. 6 | Comp. 5 |
| Shore A | 55 | 38 |
| Tensile (psi) | 498 | 172 |
| % Elongation | 162 | 186 |

TABLE 7c

Comparison of Composition 6
With Commercially Available Composition
(Natural Gear Oil)

| Physical | 70 hrs. @ 125° C. | |
|---|---|---|
| Properties | Comp. 6 | Comp. 5 |
| Shore A | 43 | 27 |
| Tensile (psi) | 455 | 113 |
| % Elongation | 210 | 157 |

TABLE 7d

Comparison of Composition 6
With Commercially Available Composition
(Semi-Synthetic Gear Oil)

| Physical | 70 hrs. @ 125° C. | |
|---|---|---|
| Properties | Comp. 6 | Comp. 5 |
| Shore A | 35 | 21 |
| Tensile (psi) | 356 | 58 |
| % Elongation | 205 | 138 |

TABLE 7e

Comparison of Composition 6
With Commercially Available Composition
(Synthetic Gear Oil)

| Physical | 48 hrs. @ 125° C. | |
|---|---|---|
| Properties | Comp. 6 | Comp. 5 |
| Shore A | 38 | 13 |
| Tensile (psi) | 402 | 41 |
| % Elongation | 270 | 148 |

These data indicate that cured elastomers formed from Composition 6 continue to exhibit excellent oil resistance even after periods of time as great as 70 hours or more in gear oil at a temperature of 125° C.

In Table 8 infra, the shear strength was measured for Composition 4 and Composition 6 initially when allowed to cure for 7 days at 25° C., and then after 70, 168 and 336 hours at the elevated temperatures as noted when immersed in type 1 natural gear oil. These data indicate that Composition 6 demonstrates significantly improved shear strength over time when measured at elevated temperature conditions.

TABLE 8

| | Shear Strength (psi) | | | | | | | |
|---|---|---|---|---|---|---|---|---|
| | Time (hrs.) @ | — | | 70 | | 168 | | 336 |
| Comp. | Temp. (° C.) | RT | 100 | 125 | 150 | 100 | 125 | 100 | 125 |
| 6 | | 206 | 407 | 199 | 46 | 411 | 126 | 227 | 93 |
| 4 | | 96 | 208 | 97 | — | 199 | 60 | 187 | 6 |

The invention being thus described, it will be clear to those persons of ordinary skill in the art that many variations exist, and are not to be regarded as a departure from the spirit and scope of the invention. All such modifications are intended to be included within the scope of the claims.

What is claimed is:

1. A silicone composition, cured elastomers of which demonstrate enhanced resistance to oil, comprising:

a. a reactive silicone component, wherein the silicone component cures by way of an addition cure mechanism or a condensation cure mechanism; and b. a basic filler component to confer oil resistance to the cured elastomer, said filler comprising a combination of magnesium oxide particles having a mean particle size of about 0.5 $\mu$M to about 1.5 $\mu$M and a mean surface area of about 50 $M^2/g$ to about 175 $M^2/g$ and calcium carbonate, wherein the magnesium oxide particles are present in amounts of at least about 5% by weight of the composition and the total basic filler is present in amounts of at least greater than about 10% by weight of the composition; and c. an addition cure catalyst, where the reactive silicone component cures by way of an addition cure mechanism.

2. The composition according to claim 1, wherein the reactive silicone component includes the combination of a vinyl-terminated silicone fluid and a hydride-functionalized silicone fluid.

3. The composition according to claim 2, wherein the vinyl-terminated silicone fluid is within the following structure:

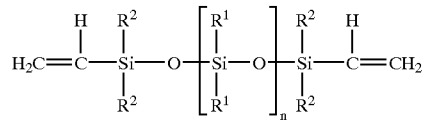

wherein $R^1$ and $R^2$ may be the same or different, and are selected from alkoxy, aryl, alkyl, haloalkyl, hydride, and hydroxide; and n is an integer within the range of about 25 to about 100,000.

4. The composition according to claim 2, wherein the hydride-functionalized silicone fluid is a polydiorganosiloxane within the following structure:

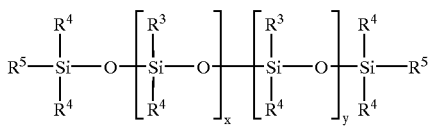

wherein at least one $R^3$ is hydrogen and the other $R^3$ is within $R^4$, $R^4$ is an unsubstituted or substituted monovalent hydrocarbon group; $R^5$ is hydrogen, or an unsubstituted or substituted monovalent hydrocarbon; or $R^3$ is within $R^4$, provided at least one $R^5$ is hydrogen; x is an integer within the range of about 3 and 10 and y is an integer within the range of 0 to about 10,000.

5. The composition according to claim 1, wherein said filler further comprises material selected from the group consisting of lithopone, zirconium silicate, calcium hydroxide, aluminum hydroxide, magnesium hydroxide, iron hydroxide, diatomaceous earth, sodium carbonate, potassium carbonate, magnesium carbonate, zinc oxide, chromic oxide, zirconium oxide, aluminum oxide, calcium clay, graphite, synthetic fibers and mixtures thereof.

6. The composition according to claim 1, wherein the addition cure catalyst is a platinum-siloxane complex.

7. The composition according to claim 1, further comprising a crosslinker.

8. The composition according to claim 1, wherein the crosslinker is selected from the group consisting of methyltrimethoxysilane, vinyltrimethoxysilane, methyltriethoxysilane, vinyltriethoxysilane, methyltriacetoxysilane, vinyltriacetoxysilane, methyl tris-(N-methylbenzamido)silane, methyl tris-(isopropenoxy)silane, methyl tris (cyclohexylamino)silane, methyl tris-(methyl ethyl ketoximino)silane, vinyl tris-(methyl ethyl ketoximino)silane, methyl tris-(methyl isobutyl ketoximino) silane, vinyl tris-(methyl isobutyl ketoximino)silane, tetrakis-(methyl ethyl ketoximino)silane, tetrakis-(methyl isobutyl ketoximino)silane, tetrakis-(methyl amyl ketoximino)silane, dimethyl bis-(methyl ethylketoximino) silane, methyl vinyl bis-(methyl ethyl ketoximino)silane, methyl vinyl bis-(methyl isobutyl ketoximino)silane, methyl vinyl bis-(methyl amyl ketoximino)silane, tetrafunctional alkoxy-ketoxime silanes, tetrafunctional alkoxy-ketoximino silanes, enoxysilanes and mixtures thereof.

9. The composition according to claim 1, further comprising a condensation cure catalyst.

10. The composition according to claim 9, wherein the condensation cure catalyst is selected from the group including dibutyltin dilaurate, dibutyltin diacetate, dibutyltin dioctoate, dibutyltin maleate, dialkyl tin hexoate, dioctyltin dilaurate, iron octanoate, zinc octanoate, lead octanoate, cobalt naphthenate, tetrapropyltitanate, tetrabutyltitanate, tin dimethyl bis neodecanoate, dialkyl tin carboxylates, mercaptans, titanates, zirconates, amino-functional silanes and mixtures thereof.

11. The composition according to claim 1, further comprising an adhesion promoter.

12. The composition according to claim 11, wherein the adhesion promoter is selected from the group consisting of octyl trimethoxysilane, glycidyl trimethoxysilane, methacryloxy propyl trimethoxysilane, vinyl trimethoxysilane and combinations thereof.

13. The composition according to claim 1, further comprising a plasticizer.

14. The composition according to claim 13, wherein the plasticizer is selected from the group including trimethylterminated polyorganosiloxanes, polybutenes, alkyl phosphates, polyalkylene glycol, polypropylene oxides), hydroxyethylated alkyl phenol, dialkyldithiophosphonate, poly(isobutylenes), poly(α-olefins) and mixtures thereof.

15. The composition according to claim 1, wherein the reactive silicone component includes a vinyl-terminated silicone fluid in an amount within the range of about a 25 to about 90% by weight of the composition, and a hydrogen-functionalized silicone fluid in an amount within the range of about 1 to about 10% by weight of the composition; the basic filler component includes a hydrophobic calcium carbonate filler in an amount within the range of about 5 to about 70% by weight of the composition; and an addition cure catalyst in an amount with the range of about 0.001 to about 1% by weight of the composition.

16. The composition according to claim 7, wherein the reactive silicone component includes a hydroxy-terminated diorganopolysiloxane; the calcium carbonate of the basic filler component includes a precipitated calcium carbonate; and the crosslinker is oximino silanes.

17. An oil resistant cured elastomer comprising the reaction product formed from the composition according to claim 1.

18. A method of providing an adhesive composition to a surface exposed to oil, comprising:
   a. applying to a surface a composition according to claim 1;
   b. forming the composition into an appropriate sealing configuration; and
   c. allowing the composition to cure wherein the cured composition demonstrates enhanced resistance to oil.

19. A method of using an oil resistant mechanical seal which demonstrates enhanced resistance to oil, comprising the steps of:
   a. applying a seal forming amount of a composition according to claim 1 on a surface of a mechanical part; and
   b. forming a seal between at least two mechanical surfaces by addition cure, wherein the seal demonstrates enhanced resistance to oil.

20. An elastomeric silicone article having improved oil resistance formed from a composition according to claim 1.

21. A gasket or O-ring formed from the article of claim 20.

* * * * *

UNITED STATES PATENT AND TRADEMARK OFFICE
CERTIFICATE OF CORRECTION

PATENT NO.    : 6,444,740 B1                                          Page 1 of 1
DATED         : September 3, 2002
INVENTOR(S)   : DeCato et al.

It is certified that error appears in the above-identified patent and that said Letters Patent is hereby corrected as shown below:

Title page,
Item [57], ABSTRACT,
Line 2, "demtonstrate" should read -- demonstrate --.

Column 1,
Line 15, the right-side portion of Formula I, "-C=H2" should read    H
                                                                 -- | --
                                                                    C=H2

Column 11,
Line 27, "150C" should read -- 150°C --.
Line 66, "Composition" should read -- Composition 2 --.

Column 18,
Line 14, "polypropylene oxides)" should read -- polypropylene (oxides) --.

Signed and Sealed this

Fifteenth Day of July, 2003

JAMES E. ROGAN
*Director of the United States Patent and Trademark Office*